United States Patent
Vedula et al.

(10) Patent No.: US 11,299,558 B2
(45) Date of Patent: Apr. 12, 2022

(54) PROCESS FOR THE PREPARATION OF LOW MOLECULAR WEIGHT HEPARIN

(71) Applicant: Biological E Limited, Telangana (IN)

(72) Inventors: Manohar Sarma Vedula, Hyderabad (IN); Sreedhar Kosgi, Hyderabad (IN); Narender Dev Mantena, Hyderabad (IN); Ratnakar Aryasomayajula, Telangana (IN)

(73) Assignee: Biological E Limited

( * ) Notice: Subject to any disclaimer, the term of this patent is extended or adjusted under 35 U.S.C. 154(b) by 0 days.

(21) Appl. No.: 16/771,098

(22) PCT Filed: Dec. 11, 2018

(86) PCT No.: PCT/IB2018/059863
§ 371 (c)(1),
(2) Date: Jun. 9, 2020

(87) PCT Pub. No.: WO2019/116217
PCT Pub. Date: Jun. 20, 2019

(65) Prior Publication Data
US 2021/0189019 A1   Jun. 24, 2021

(30) Foreign Application Priority Data
Dec. 11, 2017  (IN) .............................. 201741044415

(51) Int. Cl.
C08B 37/00  (2006.01)

(52) U.S. Cl.
CPC .................. C08B 37/0078 (2013.01)

(58) Field of Classification Search
CPC ................ C08B 37/0075; C08B 37/0078
See application file for complete search history.

(56) References Cited

U.S. PATENT DOCUMENTS

| | | |
|---|---|---|
| 5,849,721 A | 12/1998 | Uzan |
| RE38,743 E | 6/2005 | Debrie |
| 2002/0055621 A1 | 5/2002 | Diaz et al. |
| 2003/0236221 A1 | 12/2003 | De Ferra et al. |
| 2005/0049222 A1* | 3/2005 | Bianchini ........... C08B 37/0078 514/56 |
| 2018/0228833 A1* | 8/2018 | Jin ........................... A61P 7/02 |

FOREIGN PATENT DOCUMENTS

| | | | |
|---|---|---|---|
| CN | 1850865 | 10/2006 | |
| CN | 101165071 | 4/2008 | |
| CN | 101974107 | 2/2011 | |
| CN | 102040673 | 5/2011 | |
| CN | 102050888 | 5/2011 | |
| CN | 102603925 | 7/2012 | |
| CN | 102924629 | 2/2013 | |
| CN | 103342761 | 10/2013 | |
| CN | 103804523 | 5/2014 | |
| CN | 104086674 | * 10/2014 | ......... C08B 37/0078 |
| CN | 104558252 | 4/2015 | |
| CN | 106432547 | 2/2017 | |
| CN | 106977627 | 7/2017 | |
| EP | 0040144 | 11/1981 | |
| EP | 0337327 | 10/1989 | |
| EP | 1510528 | 3/2005 | |
| RU | 2512768 | 4/2014 | |
| RU | 2670767 | 10/2018 | |

OTHER PUBLICATIONS

Patel et al., "Investigation of Freezing- and Thawing-Induced Biological, Chemical, and Physical Changes to Enoxaparin Solution" Journal of Pharmaceutical Sciences vol. 98 No. 3 pp. 1118-1128 (Year: 2009).*
English machine translation of CN 104086674, from https://worldwide.espacenet.com/ (Year: 2014).*
International Search Report and Written Opinion dated Jun. 12, 2019 for International Application No. PCT/IB2018/059863.
Ingle et al., "A world of low molecular weight heparins (LMWHs) enoxaparin as a promising moiety—A review," Carbohydrate Polymers, 106:148-153 (publication date: Feb. 18, 2014).

* cited by examiner

*Primary Examiner* — Eric Olson
(74) *Attorney, Agent, or Firm* — Perkins Coie LLP

(57) ABSTRACT

The present invention provides an improved process for the preparation of Enoxaparin sodium. The process is simple, commercially viable and industrially advantageous.

13 Claims, No Drawings

PROCESS FOR THE PREPARATION OF LOW MOLECULAR WEIGHT HEPARIN

CROSS-REFERENCE TO RELATED APPLICATIONS

This application is a 35 USC § 371 National Stage application of International Application No. PCT/IB2018/059863, entitled "PROCESS FOR THE PREPARATION OF LOW MOLECULAR WEIGHT HEPARIN," filed on Dec. 11, 2018, which claims the benefit of Indian Provisional Patent Application Number 201741044415, filed on 11 Dec. 2017, which are hereby incorporated by reference herein in their entirety.

FIELD OF THE INVENTION

The present invention relates to a process for the preparation of low molecular weight heparin. More specifically, the present invention relates to an improved process for the preparation of Enoxaparin sodium.

BACKGROUND OF THE INVENTION

Heparins are biologically active agents, extracted from natural sources, and have valuable anticoagulant and antithrombotic properties. In particular, they are useful in the treatment of postoperative venous thrombosis.

Low molecular weight heparins are prepared by either chemical or enzymatic depolymerization of heparin. Low molecular weight (LMW) heparins which are approved and marketed in different countries include Enoxaparin, Dalteparin, Nadroparin, Parnaparin, Tinzaparin, Bemiparin and Certoparin.

Enoxaparin sodium is manufactured by Sanofi-Aventis and is sold in the form of injection in the United States and Europe, under the tradename Lovenox®/Clexane® respectively. Enoxaparin sodium is prepared from heparin sodium derived from porcine intestinal mucosa as starting material, by alkaline depolymerization of heparin benzyl ester salt. There are various reports/patents/patent publications that disclose the enoxaparin sodium preparation. For example, EP0040144, EP0337327, U.S. Pat. No. 5,849,721 and USRE38743 disclose Enoxaparin sodium preparation that mainly comprises the steps of preparation of benzethonium heparinate, preparation of heparin benzyl ester sodium salt and alkaline depolymerization of the heparin benzyl ester sodium salt.

Further, the following patents/patent publications disclose various modifications to the Enoxaparin sodium preparation method to meet the pharmacopoeial requirements such as formation of heparin benzethonium salt on an inert adsorbent solid matrix of filtering material, or filter-aid, purification of enoxaparin sodium with borohydride to reduce the impurities (EP1510528); production of esters of heparin by minimizing the use of benzyl chloride content (US20030236221); use of dichloromethane solvent for esterification (CN100582123C, CN104086674B and CN104558252B); ethanolic precipitation of heparin benzyl ester (CN1019741073); ethanolic precipitation of heparin benzyl ester and bleaching using hydrogen peroxide at pH 10-11 (CN102050888B); specific concentration of sodium hydroxide for depolymerization (CN106432547A); purification methods (CN100436483C, CN102040673B, CN102603925B, CN102924629B, CN103342761B and CN103804523B); pre-treatment of heparin sodium (CN106977627A); salification at 50-60° C., esterification in DMF and DMSO, ethanolic precipitation of heparin benzyl ester (RU2512768C1); and washing the benzethonium heparinate product using ultrasound, methanolic precipitation of heparin benzyl ester and removal of benzethonium protection on sulfo groups with saturated methanolic sodium acetate solution (RU2670767C1).

The processes described in the prior art disclose that the degree of esterification and depolymerization is critical to get Enoxaparin sodium with desired molecular weight and there is yield loss at every stage of the preparation and also involves the use of large quantities of solvents. In the prior art processes, in the esterification stage the reaction mass was quenched by adding sodium acetate in methanol solution to give heparin benzyl ester as a thick and hard mass which sticks to the walls of the reactor and stirrer blades, thus creating difficulties in isolation of heparin benzyl ester sodium salt, thereby rendering the operational difficulties at commercial scale.

Therefore, there is a need to develop an improved process that takes an intense care at individual stage to improve the yield of Enoxaparin sodium by reducing the content of impurities and the use of the minimum amount of reagents, solvents thereby reducing the overall production cost.

SUMMARY OF THE INVENTION

The inventors have found that the addition of water to the reaction mixture containing heparin benzyl ester results in precipitation of heparin benzyl ester mass which is easily processed for further reaction without any difficulties and bleaching the crude Enoxaparin sodium with hydrogen peroxide at a pH of about 9-10 results in a product that meets the standard color requirement. This process is simple, commercially viable and industrially advantageous. Accordingly, the present invention provides an improved process for the preparation of Enoxaparin sodium, comprising the steps of:

a) salifying heparin sodium with benzethonium chloride to form benzethonium heparinate,
b) reacting the benzethonium heparinate obtained in step (a) with benzyl chloride in an inert solvent to form a crude heparin benzyl ester,
c) adding water to the reaction mixture containing the crude heparin benzyl ester obtained in step (b) at a temperature between 0° C. to room temperature to obtain a precipitate of heparin benzyl ester,
d) adding alcoholic solution of sodium acetate to the reaction mixture containing the precipitate of heparin benzyl ester obtained in step (c) to isolate the heparin benzyl ester sodium salt,
e) depolymerizing the heparin benzyl ester sodium salt obtained in step (d) to produce crude Enoxaparin sodium,
f) bleaching the crude Enoxaparin sodium obtained in step (e) at a pH of about 9-10 to obtain a decolorized Enoxaparin sodium, and
g) purifying the decolorized Enoxaparin sodium.

DESCRIPTION OF THE INVENTION

Before the methods of the present disclosure are described in greater detail, it is to be understood that the methods are not limited to particular embodiments described, as such may, of course, vary. It is also to be understood that the terminology used herein is for the purpose of describing particular embodiments only, and is not intended to be limiting, since the scope of the methods will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the methods. The upper and lower limits of these smaller ranges may independently be included in the smaller ranges and are also encompassed within the methods, subject to any specifically excluded limit in the stated range. Where the stated range includes one or both of the limits, ranges excluding either or both of those included limits are also included in the methods.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

In an embodiment, the present invention provides a process for the preparation of Enoxaparin sodium, comprising the steps of:
a) salifying heparin sodium with benzethonium chloride to form benzethonium heparinate,
b) reacting the benzethonium heparinate obtained in step (a) in an inert solvent with benzyl chloride to obtain crude heparin benzyl ester,
c) adding water to the reaction mixture containing the crude heparin benzyl ester obtained in step (b) at a temperature between 0° C. to room temperature to obtain a precipitate of heparin benzyl ester,
d) adding alcoholic solution of sodium acetate to the reaction mixture containing the precipitate of heparin benzyl ester obtained in step (c) to isolate the heparin benzyl ester sodium salt,
e) depolymerizing the heparin benzyl ester sodium salt obtained in step (d) using inorganic base to produce a crude Enoxaparin sodium,
f) bleaching the crude Enoxaparin sodium obtained in step (e) at a pH of about 9 to 10 to obtain a decolorized Enoxaparin sodium, and
g) purifying the decolorized Enoxaparin sodium.

In certain embodiments, the benzethonium heparinate may be prepared by the interaction of a stoichiometric excess of the benzethonium chloride with heparin sodium, in an aqueous medium, at a temperature of 20° C. to 40° C.

For the esterification (step-b), the inert solvent used for dissolving the heparin benzethonium salt is selected from N,N-dimethylformamide (DMF), N,N-dimethylacetamide (DMA), methylene chloride (DCM) and the like. The ratio of benzethonium heparinate, inert solvent and benzyl Chloride may range from 1:2:1 to 1:6:1. The reaction of heparin benzethonium salt with benzyl chloride is carried out at a temperature in the range of room temperature to 70° C. for a period of 1 to 20 hours, preferably at 30 to 55° C. for 5 to 15 h. As used herein, the term "room temperature" means temperature in the range of 18° C. and 35° C.

After completion of the reaction, the heparin benzyl ester obtained as per the prior art processes is a hard and sticky mass which is difficult to extract from the process equipment and requires large volumes of alcoholic sodium acetate solution, resulting in significant yield loss.

In accordance with the present invention, it is surprisingly found that addition of small volumes of water to the reaction mixture containing the crude heparin benzyl ester results in solid which is easily processed for further reaction from the process equipment. The addition of water overcomes the prior art processes disadvantages of extraction and avoids the use of large volumes of alcoholic sodium acetate solution.

Thus, making the precipitation of the heparin benzyl ester product easy, improves the overall yield and quality of the product. For example, to 1 gm of benzethonium heparinate, 2 to 6 ml of purified water is used for precipitating heparin benzyl ester.

In another embodiment of the present invention, addition of water to the reaction mixture containing crude heparin benzyl ester obtained in step (b) is carried out at a temperature of 0 to 25° C. for 15 min to 4 hours. In a further embodiment, for 1 Kg of crude heparin benzyl ester, 7 liters of methanolic sodium acetate solution is used.

In a preferred embodiment, addition of water to the reaction mixture containing crude heparin benzyl ester is carried out at a temperature of 10 to 20° C.

In yet another embodiment, the heparin benzyl ester in the form of sodium salt is isolated by adding alcoholic solution of sodium acetate, wherein the alcohol is selected from methanol, propanol, isopropanol and mixtures thereof.

Then, according step (e), depolymerization is carried out by treating the heparin benzyl ester sodium salt with an inorganic base in an aqueous solution. In certain embodiments, the inorganic base is an alkaline hydroxide such as sodium hydroxide. The ratio of an inorganic base to heparin benzyl ester sodium salt may range from 0.05 to 0.2 by weight, and preferably from 0.08 to 0.15 by weight. In certain embodiments, the depolymerization is carried out at a temperature of 50° C. to 70° C., preferably 55° C. to 65° C. for 30 minutes to 3 hours, preferably 1 to 2 hours. In a further embodiment, the depolymerization of one part by weight of heparin benzyl ester sodium salt is admixed with 0.08 to 0.15 part by weight of sodium hydroxide, as well as with 20 to 30 parts by weight of water, and the resulting admixture is then maintained at a temperature of 55° C. to 65° C. for 1 to 2 hours to get crude Enoxaparin sodium.

The crude Enoxaparin sodium is then subjected to bleaching (step (f)) to get decolorized Enoxaparin sodium. In certain embodiments, the color of the Enoxaparin sodium is improved by using 30% hydrogen peroxide at a pH of about 9-10. The resultant product is colorless or white. In certain embodiments, bleaching step is performed by adjusting the pH to about 9-10, adding 30% hydrogen peroxide solution, stirring the mixture for about 45 minutes to 90 minutes by maintaining the pH constantly at about 9-10, readjusting the pH to 6-7, adding sodium chloride at a concentration of 5-15% (w/v) followed by precipitation with alcohol (such as methanol and ethanol). In further embodiments, bleaching step is performed by adjusting the pH to about 9.7±1, adding 30% hydrogen peroxide solution, stirring the mixture for about 60 minutes by maintaining the pH constantly at about 9.7±1, readjusting the pH to 6.0±0.1, adding sodium chloride at a concentration of about 10% (w/v) followed by precipitation with methanol (3.6 volumes), The precipitated product is then filtered and dried under vacuum at 55° C. for 9 hours to obtain decolorized enoxaparin sodium.

The decolorized product obtained after bleaching step is purified by dissolving in water, adding sodium chloride, precipitating by methanol and filtering to obtain pure Enoxaparin sodium.

In certain embodiments, the purified Enoxaparin sodium is lyophilized by dissolving in a mixture of water and alcohol to obtain Enoxaparin sodium in powder form. In certain, embodiments, the alcohol is selected from a group comprising methanol, ethanol, isopropanol and a mixture thereof. In further embodiments, the solvent is a mixture of water and ethanol. In certain embodiments, the lyophilization is carried out by dissolving pure Enoxaparin sodium in a mixture of solvent containing water at a concentration of 85 to 95% (v/v) and alcohol at a concentration of and 5 to 15% (v/v) respectively. If water alone is used as described in the prior art, then it requires more lyophilization time and yields Enoxaparin sodium as a cake with residual moisture.

In certain embodiments, the present invention provides a process for the preparation of enoxaparin sodium, which comprises the steps of:
a) salifying heparin sodium with benzethonium chloride to form benzethonium heparinate,
b) reacting the benzethonium heparinate obtained in step (a) in N, N-dimethylformamide with benzyl chloride in 1:2:1 to 1:6:1 ratio at a temperature in the range of room temperature to 70° C. for 1 to 20 hours to obtain crude heparin benzyl ester,
c) adding water to the reaction mixture containing crude heparin benzyl ester obtained in step (b) at a temperature of 10 to 25° C. and stirring for 15 minutes to 4 hours to precipitate heparin benzyl ester,
d) adding alcoholic solution of sodium acetate to the reaction mixture containing the precipitate obtained in step (c) to isolate the heparin benzyl ester sodium salt,
e) depolymerizing the heparin benzyl ester sodium salt obtained in step (d) to produce a crude Enoxaparin sodium,
f) bleaching the crude Enoxaparin sodium obtained in step (e) with 30% hydrogen peroxide at pH of about 9-10 to obtain decolorized Enoxaparin sodium, and
g) purifying the decolorized product obtained in step (f) followed by lyophilizing to obtain Enoxaparin sodium in powder form.

In certain embodiments, the process of the present invention is useful for producing Enoxaparin sodium having average molecular weight between 4000 and 5500 daltons and with 12% to 20% of fractions having a molecular weight less than 2000 daltons and 68% and 88% of fractions having a molecular weight within the range 2000 to 8000 daltons. Further, Enoxaparin sodium prepared according to the present invention meets the United States Pharmacopoeial requirement as well as sameness criteria with respect to equivalence of physicochemical properties, mode of depolymerisation and equivalence in disaccharide building blocks, fragment mapping, and sequence of oligosaccharide species.

The present disclosure is further described with reference to the following examples, which are provided to illustrate the invention and are merely for illustrative purpose only and should not be construed to limit the scope of the invention.

EXAMPLES

Examples 1-4 represent the preparation of heparin benzyl ester or its salts in accordance with the invention.

Example 1

Step a: 1718 g of water and 275 g of benzethonium chloride were fed into a round bottom flask and stirred till dissolution at room temperature. 1000 g of water and 100 g of heparin sodium were fed into another round bottom flask and stirred for dissolution. A solution of benzethonium chloride in water was added slowly to heparin sodium solution and maintained for 2.5 hours. Then, the reaction mass was filtered, and the cake obtained was washed with water repeatedly. The wet cake was dried under vacuum at 50° C. for 9 hours to obtain 291.6 g of benzethonium heparinate. Benzethonium content as measured by HPLC was 71.4%.

Step b: 50 g of benzethonium heparinate (obtained in step (a)) and 189.6 g of DMF were fed into a suitable reactor and stirred for dissolution at room temperature, then was added 22.0 g of benzyl chloride and stirred the reaction mass for 10 hours. Heparin benzyl ester was precipitated by quenching the reaction mixture by adding 220.0 g of water at 15 to 20° C. allowed to stand and decanted the supernatant to retain heparin benzyl ester as wet solid in the reactor. The wet solid was washed with a solution of 10% sodium acetate in methanol followed by methanol, filtered and dried to yield 14.8 g of heparin benzyl ester sodium salt. Benzyl alcohol content of the ester obtained was 10.7%, measured by HPLC.

Example 2

50 g of benzethonium heparinate (obtained in Example 1, step (a)) and 189.6 g of DMF were fed into a suitable reactor and stirred for dissolution at room temperature, then was added 22.0 g of benzyl chloride and stirred the reaction mass was then stirred for 15 hours. Heparin benzyl ester was precipitated by quenching the reaction mixture by adding 220.0 g of water at 10 to 20° C., allowed to stand and decanted the supernatant to retain heparin benzyl ester as wet solid in the reactor. The wet solid was washed with a solution of 10% sodium acetate in methanol followed by methanol, filtered and dried to yield 15.2 g of heparin benzyl ester sodium salt. Benzyl alcohol content of the ester obtained was 11.5%, measured by HPLC.

Example 3

10 g of benzethonium heparinate (obtained in Example 1, step (a)) and 37.92 g of DMF were fed into a suitable reactor and stirred for dissolution at room temperature, then was added 4.4 g of benzyl chloride and stirred the reaction mass for 6 hours. Heparin benzyl ester was precipitated by quenching the reaction mixture by adding 44.0 g of water at 10 to 15° C., allowed to stand and decanted the supernatant to retain heparin benzyl ester as wet solid in the reactor. The wet solid was washed with a solution of 10% sodium acetate in methanol followed by methanol, filtered and dried to yield 3.19 g of heparin sodium benzyl ester. Benzyl alcohol content of the ester obtained was 6.6%, measured by HPLC.

Example 4

70 g of benzethonium heparinate (obtained in Example 1, step (a)) and 265.44 g of DMF were fed into a suitable reactor and stirred for dissolution at room temperature, followed by the addition of 38.5 g of benzyl chloride and the reaction mass was then stirred for 15 hours. Heparin benzyl ester was precipitated by quenching the reaction mixture by adding 308.0 g of water at 10 to 20° C., allowed to stand and decanted the supernatant to retain heparin benzyl ester as wet solid in the reactor. The wet solid was washed with a solution of 10% sodium acetate in methanol followed by methanol, filtered and dried to yield 21.4 g of heparin benzyl estersodium salt. Benzyl alcohol content of the ester obtained was 11.1%, measured by HPLC.

Example 5

Preparation of Enoxaparin Sodium According to the Present Invention

Step a: 1718 g of water and 275 g of benzethonium chloride were fed into a round bottom flask and stirred till dissolution at room temperature. 1000 g of water and 100 g of heparin were fed into another round bottom flask and stirred for dissolution. A solution of benzethonium chloride in water was added slowly to heparin solution and maintained for 2.5 hours. Then the mass was filtered, and the cake obtained was washed water repeatedly. The wet cake was dried under vacuum at 50° C. for 9 hours to obtain 291.6 g of benzethonium heparinate. Benzethonium content as measured by HPLC was 71.4%.

Step b: 70 g of benzethonium heparinate obtained in step (a) and 265.44 g N, N-dimethylformamide were fed into a round bottom flask and stirred, followed by the addition of 21.17 g of benzyl chloride slowly and the reaction mass was then stirred for 7 hours at room temperature.

Step c: Heparin benzyl ester was precipitated by quenching the reaction mixture by adding 308.0 g of water at 10 to 20° C., allowed to stand and decanted the supernatant to retain heparin benzyl ester as wet solid in the reactor.

Step d: The wet solid obtained in step (c) was washed with a solution of 10% sodium acetate in methanol followed by methanol, filtered and dried to yield 21.2 g of heparin benzyl ester sodium salt. Benzyl alcohol content of the ester obtained was 7.4%, measured by HPLC.

Step e: 10.0 g of the heparin benzyl ester sodium salt obtained in step (d) was suspended in 297 ml of purified water and heated under agitation to 60°±1° C., followed by the addition of 33 ml of 1N sodium hydroxide solution. The contents were stirred at 60°±1° C. for 60 minutes.

Step f: The solution obtained in step (e) was cooled to room temperature and pH was adjusted to 9.7±1 with 1N hydrochloride acid. Added 4.0 ml of 30% hydrogen peroxide solution and the mixture was stirred for 60 minutes by maintaining the pH constantly at 9.7±1 by adding 1N sodium hydroxide solution. Then the pH was readjusted to 6.0±0.1 with 1 N hydrochloride acid and sodium chloride was added to the reaction mixture in a quantity sufficient to achieve 10% (w/v). The product was precipitated by adding 3.6 volumes of methanol, filtered and dried under vacuum at 55° C. for 9 hours to obtain 7.03 gm of crude enoxaparin sodium.

Step g: The crude enoxaparin sodium (5 gm) obtained in step (f) was suspended in 50 ml of purified water and dissolved. Added 5 gm of sodium chloride and stirred. The product was precipitated by adding 150 ml of methanol, filtered and dried under vacuum at 55° C. for 9 hours to obtain 4.39 gm of enoxaparin sodium.

Step h: Charged 75 mL of water followed by 8.33 mL of ethanol in to a 100 mL 3 neck round bottom flask. To this, Enoxaparin sodium obtained in step (g), was added and stirred for dissolution, filtered the solution through 0.22μ filter and loaded the solution in lyophilization trays and freeze-dried to obtain Enoxaparin sodium in powder form (4.2 gm).

Molecular weight distribution and weight average molecular weight by size exclusion-high-performance liquid chromatography SEC-HPLC:

| Mw | $M_{2000}$ | $M_{8000}$ | $M_{2000-8000}$ |
| --- | --- | --- | --- |
| 4283 | 18.5 | 10.5 | 71.1 |

The obtained Enoxaparin sodium met the United States Pharmacopoeial requirement as well as sameness criteria with respect to equivalence of physicochemical properties, mode of depolymerisation and equivalence in disaccharide building blocks, fragment mapping, and sequence of oligosaccharide species.

Comparative Example 6

Preparation of Heparin Benzyl Ester Sodium Salt (Without Addition of Water)

205 g of benzethonium heparinate (obtained in Example 1, step (a)) and 774 g of DMF were fed into a suitable reactor and stirred for dissolution at room temperature, raised the temperature to 60° C. Added of 62 g of benzyl chloride slowly and the reaction mass was then stirred for 15 hours. Reaction mixture was added to a solution of sodium acetate in methanol and water (307 g, 1264 g, and 451 g respectively) at 55° C. Hard thick solid was formed and maintained for 2 hrs at around 55° C. and was washed with a solution of 10% sodium acetate in methanol followed by methanol and dried to yield 44.2 g of heparin sodium benzyl ester. Benzyl alcohol content of the ester obtained was 11.06%, measured by HPLC.

This comparative example, thus, shows that addition of water to the crude heparin benzyl ester increases the yields of the ester, thereby Enoxaparin sodium.

What is claimed is:

1. A process for the preparation of Enoxaparin sodium, comprising the steps of:
   a) salifying heparin sodium with benzethonium chloride to form benzethonium heparinate,
   b) reacting the benzethonium heparinate obtained in step (a) with benzyl chloride in an inert solvent to form a crude heparin benzyl ester,
   c) adding water to the reaction mixture containing the crude heparin benzyl ester obtained in step (b) at a temperature of 0° C. to room temperature to obtain a precipitate of heparin benzyl ester,
   d) adding an alcoholic solution of sodium acetate to the reaction mixture containing the precipitate of heparin benzyl ester obtained in step (c) to isolate the heparin benzyl ester sodium salt,
   e) depolymerizing the heparin benzyl ester sodium salt obtained in step (d) with sodium hydroxide to produce crude Enoxaparin sodium,
   f) bleaching the crude Enoxaparin sodium obtained in step (e) at a pH of about 9-10 to obtain a decolorized Enoxaparin sodium, and
   g) purifying the decolorized Enoxaparin sodium.

2. The process as claimed in claim 1, wherein the inert solvent is selected from N,N-dimethylformamide (DMF), N,N-dimethylacetamide (DMA) and methylene chloride.

3. The process as claimed in claim 1, wherein the ratio of benzethonium heparinate, inert solvent and benzyl chloride ranges from 1:2:1 to 1:6:1 by weight.

4. The process as claimed in claim 1, wherein the addition of water to the reaction mixture containing the crude heparin benzyl ester obtained in step (b) is carried out at a temperature of 10° C. to 25° C. for 15 minutes to 4 hours.

5. The process as claimed in claim 1, wherein the depolymerization is carried out by treating the heparin benzyl ester sodium salt with an aqueous solution of the sodium hydroxide at a temperature of 50° C. to 70° C. for 30 minutes to 3 hours.

6. The process as claimed in claim 5, wherein the ratio of sodium hydroxide to heparin benzyl ester sodium salt is from 0.05 to 0.2 by weight.

7. The process as claimed in claim 1, wherein the bleaching is carried out using 30% hydrogen peroxide.

8. The process as claimed in claim 1, wherein the decolorized Enoxaparin sodium is purified by dissolving it in water, adding sodium chloride, and precipitating with alcohol.

9. The process as claimed in claim 8, wherein the purified Enoxaparin sodium is subjected to lyophilization to obtain Enoxaparin sodium in powder form.

10. The process as claimed in claim 9, wherein the lyophilization is carried out by dissolving the pure Enoxaparin sodium in a mixture of water and alcohol.

11. The process as claimed in claim 10, wherein the alcohol is selected from a group comprising methanol, ethanol, isopropanol and a mixture thereof.

12. The process as claimed in claim 9, wherein the lyophilization is carried out in a mixture of water and ethanol.

13. The process as claimed in claim 10, wherein water and alcohol are present at a concentration of 85 to 95% (v/v) and 5 to 15% (v/v) respectively.

* * * * *